(12) United States Patent
Dóra et al.

(10) Patent No.: US 11,726,027 B2
(45) Date of Patent: Aug. 15, 2023

(54) DISPOSABLE INJECTION MOLDABLE FLOW CELL FOR USE IN FLOW CYTOMETRY

(71) Applicant: DIATRON MI PLC, Budapest (HU)

(72) Inventors: Péter Dóra, Vácegres (HU); Miklós Zsolt Svarcz, Pomáz (HU)

(73) Assignee: DIATRON MI PLC, Budapest (HU)

( * ) Notice: Subject to any disclaimer, the term of this patent is extended or adjusted under 35 U.S.C. 154(b) by 0 days.

(21) Appl. No.: 17/306,042

(22) Filed: May 3, 2021

(65) Prior Publication Data
US 2021/0349003 A1 Nov. 11, 2021

(30) Foreign Application Priority Data
May 11, 2020 (LU) .................................. 101790

(51) Int. Cl.
| | | |
|---|---|---|
| *G01N 21/05* | (2006.01) | |
| *G01N 15/14* | (2006.01) | |
| *G01N 21/03* | (2006.01) | |
| G01N 15/00 | (2006.01) | |
| G01N 15/10 | (2006.01) | |

(52) U.S. Cl.
CPC ......... *G01N 21/05* (2013.01); *G01N 15/1404* (2013.01); *G01N 21/03* (2013.01); *G01N 2015/0065* (2013.01); *G01N 2015/1006* (2013.01); *G01N 2015/1409* (2013.01); *G01N 2021/0378* (2013.01)

(58) Field of Classification Search
CPC .............. G01N 15/1404; G01N 21/03; G01N 2015/0065; G01N 2015/1006; G01N 2015/1409; G01N 2021/0378; G01N 15/0211; G01N 15/1459; G01N 2015/1413; G01N 2015/1493; G01N 2015/1497; G01N 21/05; G01N 21/53
See application file for complete search history.

(56) References Cited

U.S. PATENT DOCUMENTS

| | | | |
|---|---|---|---|
| 5,690,895 A | | 11/1997 | Matsumoto |
| 5,808,737 A | * | 9/1998 | Edens ................ G01N 15/1404 356/336 |
| 6,506,609 B1 | | 1/2003 | Alajoki et al. |
| 7,113,266 B1 | | 9/2006 | Wells |
| 7,311,476 B2 | * | 12/2007 | Gilbert ............... G01N 15/1404 406/198 |
| 7,340,957 B2 | | 3/2008 | Goddard et al. |
| 7,638,339 B2 | | 12/2009 | Berlin et al. |
| 11,262,292 B2 | * | 3/2022 | Ota ...................... G01N 33/493 |

(Continued)

FOREIGN PATENT DOCUMENTS

DE 102007017318 A1 10/2008

*Primary Examiner* — Michael P LaPage
(74) *Attorney, Agent, or Firm* — 24IP Law Group USA, PLLC; Timothy Dewitt

(57) ABSTRACT

A disposable injection moulded flow cell or cuvette for use in flow cytometer for in vitro assaying of human or animal whole blood and to an investigation method using the flow cytometer. The present disclosure provides a cuvette for use in an optical flow cytometer, comprising a cuboid sheath preparation area, a curved sample injection area with a rectangular cross section, a pyramidal shaped flow formation area, and a sample injector which is arranged in the transition area from the cuboid sheath preparation area to the curved sample injection area.

11 Claims, 6 Drawing Sheets

(56) References Cited

U.S. PATENT DOCUMENTS

| | | |
|---|---|---|
| 2005/0255001 A1 | 11/2005 | Padmanabhan et al. |
| 2007/0009386 A1 | 1/2007 | Padmanabhan et al. |
| 2009/0066936 A1 | 3/2009 | Huang et al. |
| 2010/0060892 A1* | 3/2010 | Beck .................. B01L 3/502776 356/246 |
| 2018/0372612 A1* | 12/2018 | Masuda ............. G01N 15/1404 |

* cited by examiner

DISPOSABLE INJECTION MOLDABLE FLOW CELL FOR USE IN FLOW CYTOMETRY

CROSS-REFERENCE TO RELATED APPLICATIONS

The present application claims priority to Luxembourg Patent Application No. LU 101790 filed on May 11, 2020. The aforementioned application is hereby incorporated by reference in its entirety.

BACKGROUND OF THE INVENTION

Field of the Invention

The present invention relates to a disposable injection moulded flow cell or cuvette for use in flow cytometer for in vitro assaying of human or animal whole blood and to an investigation method using the flow cytometer.

Brief Description of the Related Art

Flow cytometers are laboratory devices used for performing rapid multi-parametric assaying of cells. The technique allows to detect, analyze and separate each cell type within a mixed cell population based on phenotypes or functional states. Flow cytometers are able to determine a part of the parameters through optical based measurements. The technique is based on the analysis of scattered or absorbed polarized light to determine populations of the cellular components. Published U.S. Pat. No. 7,113,266 teaches such a technique.

Moreover, by means of an optical based measurement, the size and the granularity of various formed elements (i.e., red blood cells, blood platelets, white blood cells, such as lymphocytes, monocytes, granulocytes, etc.) of a given sample can be measured simultaneously. Such samples can be provided in the form of a human or animal whole blood sample for instance.

Microfluidic devices used for flow cytometry are also known. Published U.S. Patent Application No. US 2009/0066936 A discloses a microfluidic device comprising inlets for a sample flow and an out-of-plane focusing sheath flow, and further a curved channel section configured to receive the sample flow and out-of-plane focusing sheath and to provide hydrodynamic focusing of the sample flow in an out-of-plane direction, the out-of-plane direction being normal to a plane including the curved channel. The provided device uses a turning flow channel.

Published U.S. Pat. No. 7,340,957 B2 relates to an ultrasonic analyte concentration and its application in flow cytometry. This document discloses an apparatus and a corresponding method for concentrating analytes within a fluid flowing through a tube using acoustic radiation pressure. The apparatus comprises a function generator that outputs a radio frequency electrical signal to a transducer that transforms the radio frequency electric signal to an acoustic signal and couples the acoustic signal to the tube. The acoustic signal is converted within the tube to acoustic pressure that concentrates the analytes within the fluid.

Published U.S. Pat. No. 7,638,339 teaches a micro-fluidic device containing a micro-fluidic inlet channel to convey a process flow, a plurality of micro-fluidic focusing channels to each convey one of a plurality of focusing flows, a focusing manifold coupled with the inlet channel at an inlet port thereof and with the plurality of focusing channels at a plurality of focusing channel ports thereof to focus the process flow by contacting and hydrodynamically impacting at least three sides of the process flow with the focusing flows, and a micro-fluidic outlet channel coupled with the focusing manifold at an outlet channel port to convey the combined focused process flow and focusing flow from the focusing manifold.

Published U.S. Pat. No. 6,506,609 B1 relates to methods and systems for particle focusing to increase assay throughput in microscale Systems are provided. The document teaches methods for providing substantially uniform flow velocity to flowing particles in microfluidic devices. Methods of sorting members of particle populations are also part of the document's disclosure, such as cells and various subcellular components. Integrated systems in which particles are focused and/or are sorted are additionally included.

It appears disadvantage in the existing solutions that the maximum sample volume that goes throw the flow cell is 10-20 µl/s. The known systems seem to be limited to such a flow speed, because the flow speed will be limited by the laminar-turbulent speed limit. The width of the sample flow is limited by the flatness of the laser power distribution in the crossing area and the vertical stability of the flow. The sample dilution is limited by that coincidence because this dilution is measured by the Coulter method too. The maximum sample flow size in known systems is around 40 µm*40 µm. It would be helpful if the flow would be increased towards the laser direction. The best geometry to achieve is the "plate flow", it is parallel to the direction of the laser with a constant, thin width that is perpendicular to the laser direction. It is hardly possible to create such a flow by the currently known solution.

Typical solutions from the prior art further are based on the alignment based on a mechanical movement of the optical elements, without a change of the position of the sample flow by changing the velocity of it by a positive displacement pump which is an essential element of the existing systems. The common sample input from known systems for the consecutive samples further increases the length of the washing period. The currently known solutions can collect the light using additional optical lenses.

Thus, there is a need for a flow cell being capable of creating a plate flow.

SUMMARY OF THE INVENTION

It is an object of the present invention to provide a flow cell for flow cytometry that allows to create a plate flow.

The present disclosure provides a cuvette for use in an optical flow cytometer, comprising a cuboid sheath preparation area, a curved sample injection area with a rectangular cross section, a pyramidal shaped flow formation area, and a sample injector which is arranged in the transition area from the cuboid sheath preparation area to the curved sample injection area.

In a further aspect of the invention, the major axis of the sample injector can be arranged perpendicular to the path of a laser beam.

In a further embodiment of the cuvette, more than half of the sample injector can be arranged perpendicular to the path of a laser beam.

It is also envisaged that a cuvette according to the invention may comprise more than one sample injector.

In another object of the invention, the sample injection element (203a) can be curved and elliptical or may have a rectangular shape with a smaller and a bigger axis which is perpendicular orientated with respect to the path of a laser beam.

The cuvette may also be connected to the flow cell.

Another object of the present invention is an optical flow cytometer comprising a cuvette as disclosed in the previous paragraphs.

Another object of the invention relates to the use of an optical flow cytometer as described above for measuring simultaneously in vitro at least one property of an element or cellular component of a biological sample, wherein the at least one property is selected from the group comprising size, shape, internal granularity, maturity and corpuscular volume.

In a further embodiment, the optical flow cytometer may comprise a as described above, wherein the speed of the sample in the injection element changeable compares to the speed of the sheath fluid and the injector is perpendicular to the laser axis.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

Figure 1:
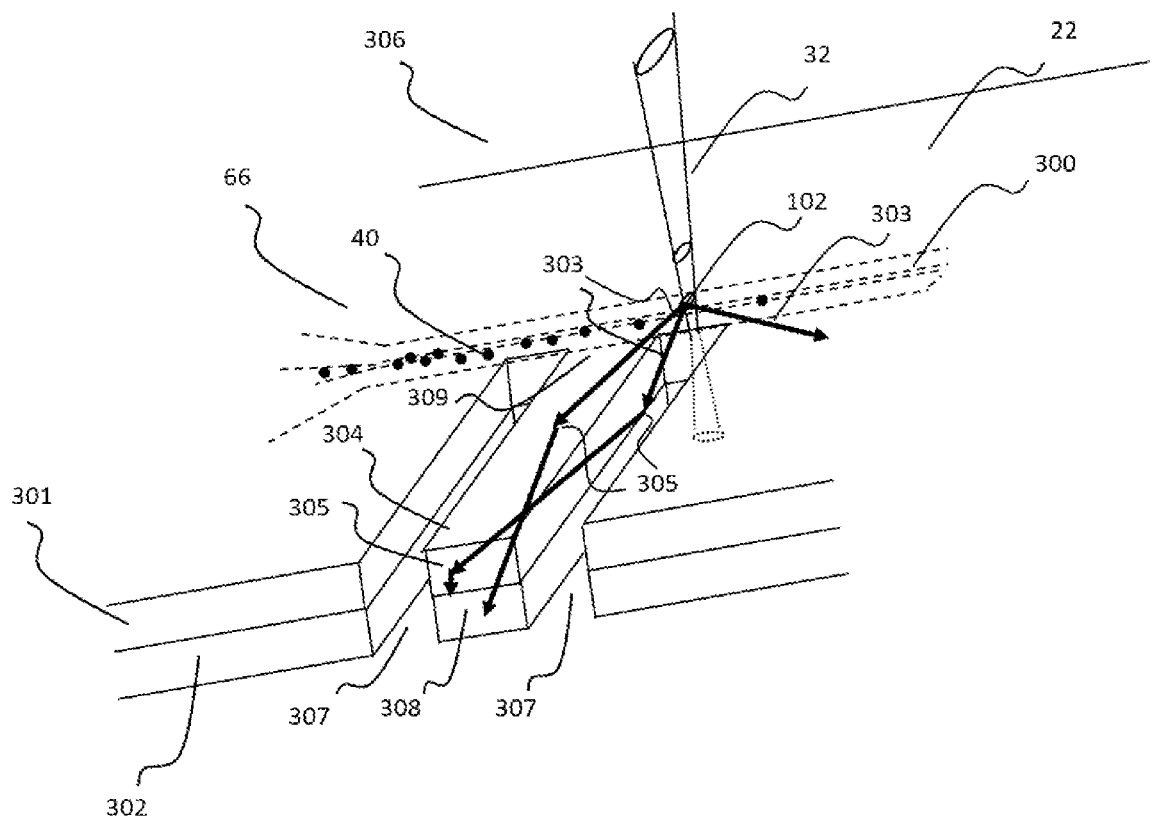
FIG. 1 shows a structural drawing of an embodiment of a cuvette with a unifying element, flow cell (FIG. 3) and integrated light guide with a rectangular cross section.

The technical problem is solved by the independent claims. The dependent claims cover further specific embodiments of the invention.

The present invention describes a cuvette or cell intended for use in an optical flow cytometer for performing assays in vitro with cellular components in a liquid sample and a measurement method to it.

The new system is able to create the needed 'plate flow', by the design or shape of the element connected to the flow cell. Said element comprises a sheet flow pre-forming area which is necessary for creating a proper geometry of the sheet flow before the sample injection point. Furthermore, there is a sample injection point nearly perpendicular to said sheet flow pre-forming area for inserting the sample into the sheet flow and for forming it. Finally, the element comprises a post forming area which forms the combined flow comprising the sample resulting in the 'plat flow'. The new design is moldable in the sense that it is formed by two moldable interconnected flat elements.

The injection axis of the sample flow is perpendicular to the axis of the laser. If the speed of the sample flow is changed, relative to the sheet flow, the position of the sample flow will be changing inside of the flow cell to create the proper alignment between the laser and the sample flow. The alignment is essential in a disposable device. The analyzer aligns the sample flow during the start up or if there is need for alignment and can find the proper position based on the scattered light intensity.

The new system may comprise more than one sample injector, to reduce the washing time between consecutive samples. The individual sample injector can produce despite their different positions the same combined flow structure. The optical light guide, which is integrated into the flow cell, is able to collect the light, scattered or emitted nearly perpendicular to the laser axis without extra any components being necessary.

The flow cell, the cell connector and the side scatter light guide can be formed by two stackable plastic sheets. Said cell connector may contain at least one fluid channel for the sample and one fluid channel for the sheath fluid and further a fluid channel for the combined flow to create a T junction.

In a further embodiment the fluid channel has a small angle diffuser in the sheath flow pre-forming area. The sheath flow is laminar in the output of this diffuser. The axis of the sheath pre-forming area and the axis of the sample injection area is at an angle of about 80 degree to each other. The sample channel and the sheath channel are nearly perpendicular in the injection point. The sharp edges of the sample injector ending enables the detachment of the sample flow from the surface. The speed vector of the sample flow is set by the sample injector to insert the sample flow in a proper position. The parallel component of the velocity vector of the sample flow reduces turbulences and the perpendicular component sets the transverse position of the sample flow. The cross section of the sheath flow has a rectangle shape in the injection point where it continuously changes to a square shape in the input of the flow cell. This area forms the combined flow and create a 'plate flow' in the input of the flow cell.

Figure 2:
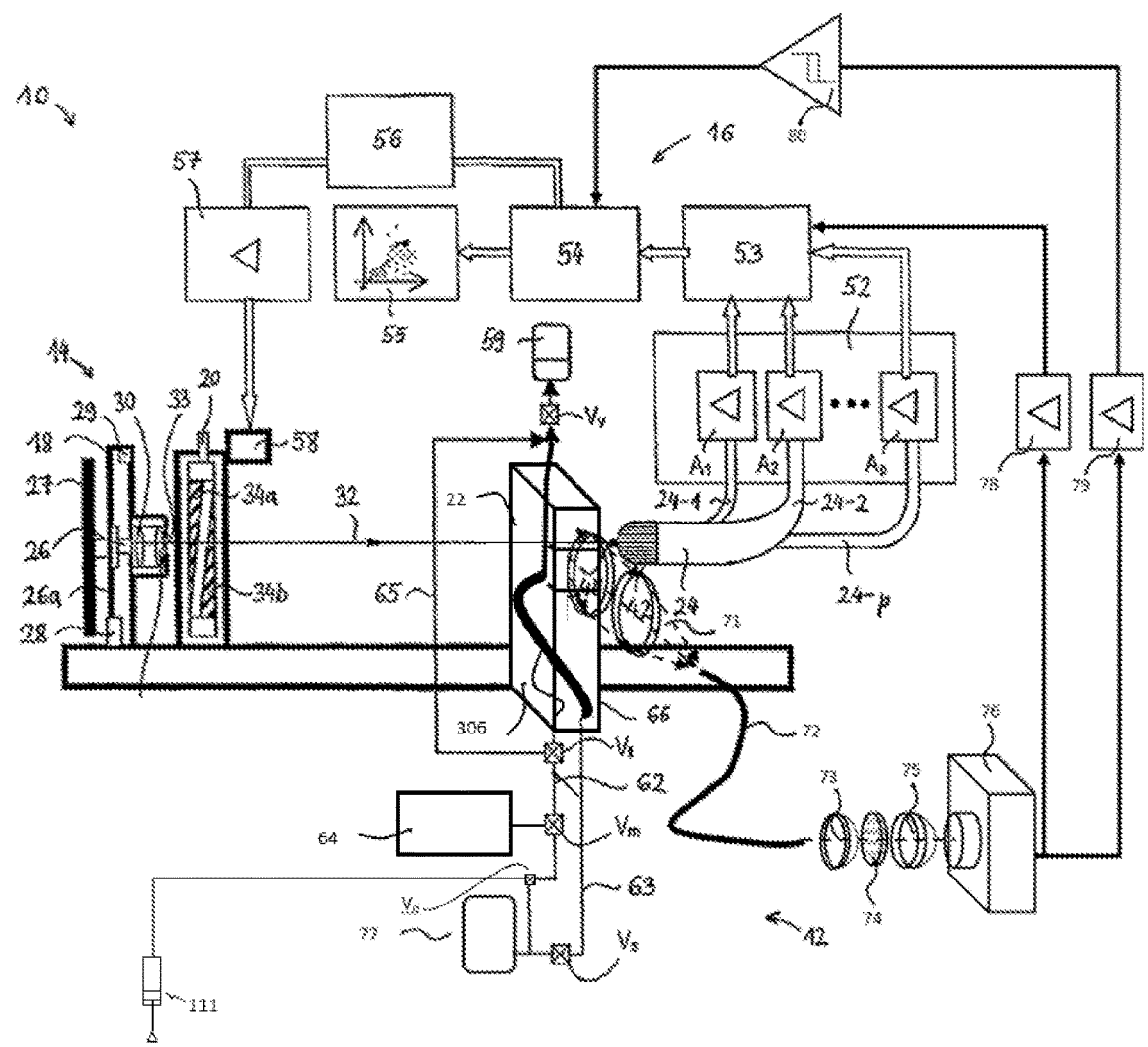
FIG. 2 shows an embodiment of an optical flow cytometer.

FIG. 1 is a structural drawing of possible embodiment of the cuvette 306 which contains a unifying element 66 and flow cell 22 shown in FIG. 2 and an integrated light guide 304 with rectangular cross section. The laser beam 32 illuminates the diluted particles flows in the channel of the flow cell 300 and a part of the light is scattered 303 from the particles. The light guide 300 transmit the scattered light into the right-angle detector.

FIG. 2 illustrates an embodiment of an optical flow cytometer 10 according to the invention that serves for a simultaneous and in vitro measurement of several properties (size, internal granularity, maturity, corpuscular volume etc.) of a biological sample, for example of formed elements or further cellular components, in human or animal whole blood or other body fluid mixed up with one or more reagents chosen from a broad range of reagents or colored with available fluorescent dyes.

Said flow cytometer 10 basically comprises three major components that are co-operating with each other: a hydro-pneumatic unit 12 for preparing a solution of the biological sample reacted with proper reagents or available fluorescent dyes and transporting it to the location of the assay; an optical unit 14 for providing an appropriate illumination of the sample solution during measurement, as well as for collecting and directing the light that is scattered by said sample and collecting the emitted fluorescence light that is eradiated from said colored sample and carries and separate information associated with the properties of the formed elements of the sample to the sensing element(s); and a controlling and evaluating unit (16) that processes the electrical signals of said sensing element(s) generated by the incident light directed to said sensing element(s) and uses at least a part of the thus obtained pieces of information to control the operation of the optical unit 14 and/or to determine desired properties of the formed elements.

The optical unit 14 comprises a transmitter module 18 providing the illumination needed for the measurement to be performed, an optional beam moving device 20, a flow cell 22 and an optical fiber bundle 24 or a direct light detector, all arranged in a light path, and rectangular light collector module collect the light emitted or scattered from the said colored or not colored particles and transmit a part of this light into the multi-element avalanche photodiode array detector or photodiode or avalanche photodiode detector. There are two preferred embodiments: a first embodiment refers to an optical unit that comprises a fluorescent light collector module which has a filter module with a wave length dependent transfer function and a high sensitivity detector to be able to detect the light emitted from the particle colored by the fluorescent dye, the other embodiment refers to an optical unit (14) that comprises a side scattered light collector module which has a low sensitivity detector enabling to detect the light scattered from the particle. The fluorescence light collector module comprises light guide 304 and a light collector element 70 and fiber coupling elements 71 and an optical fiber 72 arranged perpendicular to the light path at the flow cell 22. The elements collect said light emitted or scattered perpendicular to the laser beam 32 from the particles and couple it into said optical fiber 72. The optical fiber 72 transmits said emitted or scattered light to the filter module which contains a condenser lens 73 to create a parallel beam. One or more optical filter(s) 74 with wavelength dependent transmission coefficient and a coupling element 75 are arranged in an optical axis which transmit the higher wavelength fluorescence light coming from the colored particles into the multi-element avalanche photodiode array detector and block the lower wavelength scattered light coming from the particles or coming from the laser source and reflected from the other optical elements like flow cell 22.

The side scattered light collector module compresses light guide 304 and light collector elements 70 arranged perpendicular to the light path at the flow cell (22). The elements collect light scattered from perpendicular with respect to the laser beam 32 from the particles and couple the said photodiode or avalanche photodiode detectors. The light guide 304 forms a common element with the cuvette 306 it made from the same material with higher refractive index than the air. In one preferred embodiment the side scattered detector directly inserted close to the end of the light guide without any of the additional optical element.

The transmitter module 18 comprises a laser source 26 (as illumination device), a driving circuit 27 to provide electric supply of said laser source 26, as well as a temperature stabilizing means 28 (preferably a Peltier element for cooling and a resistive heater for heating; not shown in the figures) for stabilizing the temperature of said laser source 26 based on a signal generated by a temperature sensor 29. The laser source provides an illuminating laser light at one or more wavelengths with a constant averaged or high frequency modulated light output.

Said laser source 26 is preferably formed by one or more laser diodes emitting at different wavelengths, wherein said diode(s) is (are) arranged at a starting point of said light path. An optical axis of the optical unit 14 is defined by a straight line that extends from the laser source 26 to a common end 42 of said optical fiber bundle 24 or to directly to the detector. In said light path, in the propagation direction of the laser light emitted by the laser source 26 there is provided a collimator 30 means forming part of the transmitter module 18 Said collimator 30 means collimates the laser light.

To focus and shape the collimated laser light vertically onto the flow cell 22 and horizontally onto the optional beam stopper plate 46 or the predefined area of the detector beam shaping elements are inserted into the laser beam after the collimator. The thus obtained laser beam 32 forms a spot 102 of an in a plane perpendicular to its propagation direction that illuminates the flow cell 22 in a pre-defined zone.

The laser beam 32 goes throw the flow cell 22 and forms a spot of an elliptical shape in a plane perpendicular to its propagation directions that illuminates said beam stopper plate 46 or a specified area of the detector.

The laser beam 32 which leaves the beam moving device 20 falls on the flow cell 22 which is a part of the cuvette 306. In its simplest possible embodiment, a plan parallel plate forms the flow cell 22 of the cuvette 306, wherein a flow passage 300 with a longitudinal extension is formed within the bulk of said plan parallel plate. Consequently, said plate has a given wall thickness along the propagation direction of the laser beam 32. In general, the cross section of the flow passage 300 taken in a plane perpendicular to the length of the flow cell 22 has preferably a rectangular shape. The diameter of the flow passage 300 ranges from at least 100 μm to at most several hundred it is preferably about 250 μm in size. The lower end of the flow passage 300 broadens so that it can be form a common cuvette 306 with the unifying element 66.

As already described above, the laser beam 32 illuminates the flow cell 22 at the centerline of its passage 300 in a basically elliptical spot 102 (the illumination zone). The lengths of the minor and the major axes of said elliptical spot 102 is between about 10 μm to about 50 μm and between about 150 μm to 400 respectively. Preferably, said lengths are about 20 μm and about 200 respectively, in size. The cuvette has two incisions 307 perpendicular to the laser beam, which produce 304 light guides at the illumination zone.

The flow cell 22 is arranged within the optical unit 14 so as to contain the flow passage 300 in a position basically perpendicular to the optical axis. Accordingly, the sample to be assayed flows within the flow cell 22 in a direction essentially perpendicular to the optical axis of the optical unit 14. The plan parallel plate forming of the flow cells 22, are made of plastic materials, as well as of any suitable materials that are transparent at the wavelength(s) of laser light(s) emitted by the laser source 26 and transparent at wavelength of fluorescent light emitted by the fluorescent particle of the sample and unaffected by the substances directed through said passages 22. The refractive index of the material is higher than the air. The light guide 304 is rectangular cross section and the axis of the light guide is in a straight line of the cross section of the laser beam 32 and the flow passage 300. A skilled person in the art will be able to choose appropriate materials.

Returning now to FIG. 1, during the measurement the sample to be assayed that flows through the passage 300 of the flow cell 22, wherein the objects 40 of the assay (depending on the sample, for example formed elements of whole blood or other cellular components and similar elements or fluorescently painted particles) flow essentially in the centerline of the flow one by one.

During propagation, the objects 40 reach a region of the passage 300 that is illuminated by the laser beam 32 (that is, the illumination zone), wherein a part of the laser light striking said objects 40 scatters to all directions of space according to a given distribution (i.e., in a given pattern). As it is well-known, the objects 40 differing in size and shape and also having optionally an internal structure or asymmetric shape scatter the striking light to a various extent into different spatial directions. From the analysis of the scattered light with respect to the spatial pattern, for example by given conical angle ranges, a conclusion can be made with regard to the sought properties of said objects 40.

To this end, as a next step of the measurement there is a need for collecting the laser light scattered into the various spatial regions. This is the task of the light guide 304 and the optical fiber bundle 24 (comp. FIG. 2). The optical fiber bundle 24 has a (common) frontal end 42 with a particular shape or a direct detector that has separated regions. Depending on the number of different spatial regions selected for a study of the objects 40 (consisting of e.g. the cellular components), the optical fiber bundle 24 is split into a plurality of separate offtake bundles 24-1, 24-2, . . . , 24-$p$, wherein every single offtake bundle 24-1, 24-2, . . . , 24-$p$ transmits laser light scattered into a certain spatial region under study and collected therefrom to the controlling and evaluating unit 16, the components of which will be discussed later. In case of a direct detector, it has 1, 2, . . . , p separate area wherein every single separate area of the direct detector converts the laser light scattered into a certain spatial region to electrical signals and this signals come to the input of the amplifier module 52. The light guide 304 connects to the body of the cuvette 306 cross the connection surface which is surrounded by the upper and the lower surface of the cuvette 306 and the side surfaces of the incisions 307. The part of the scattered light 303 coming from the illuminated objects 40 within a spatial angle range steps into the body of the light guide 304 through the connection surface of the light guide 309 and goes through the light guide 304 meanwhile a part of the scattered light 303 hits the outer surface of the light guide and is reflected totally 305 from the surface if the incidence angle is higher than the critical angle, where $n_2$ and $n_1$ is the refractive index of the two material:

$$\theta_c = \arcsin(n_2/n_1)$$

In this way the scattered light can goes through the body of the light guide and can go through the end surface of the light guide 308. In a further embodiment the right-angle detector is placed directly to the end surface of the light guide 308 and converts the laser light scattered into a perpendicular spatial region to electrical signals and these signals come to the input of the amplifier module 52.

In another embodiment there are additional optical element inserted between the detector and the end surface of the light guide 308. Fluorescent dyes are well known for coloring cellular elements of a whole blood sample in a different degree, depending on the physical, chemical and biological properties of said elements. Physiologic properties like maturity of cellular elements have influence on said physical, chemical and biological properties and thus modify the degree of fluorescence. A part of the laser light hits objects or other cellular components of a whole blood sample during its propagation through the centerline of the sample flow area 221. A fluorescent dye will be excited by said laser light and a part of the energy of the laser light will be emitted back with a longer wavelength as fluorescent light. The intensity of the emitted fluorescent light from the colored objects 40 depends from the physiological properties of said objects 40. The light emitted from the fluorescently painted objects 40 within a spatial angle range steps into the body of the light guide 304 through the connection surface of the light guide 309 and goes through the light guide 304 meanwhile a part of the scattered light 303 hits the outer surface of the light guide and is reflected totally 305 from the surface if the incidence angle is higher than the critical angle.

In this way the fluorescent light can goes through the body of the light guide and can go through the end surface of the light guide 308.

The frontal end 42 of the optical fiber bundle 24 is divided into (preferentially ring-shaped) regions by means of separating plates. Optical fibers belonging to the respective regions form the offtake bundles 24-1, 24-2, . . . , 24-$p$ (FIG. 2) that are connected to said controlling and evaluating unit 16.

In a further embodiment the optical fiber bundle 24 is equipped with an elongated beam stopper plate 46 extending perpendicular to the optical axis on its frontal end 42 and transmit the said light to the detectors. In another embodiment the detector is formed by individual detectors (preferentially having a ring or ring segment shape) placed directly in the optical axis without using fiber bundle. The detectors are connected with the input of the analogue amplifier module 52. The output of the analogue amplifier is connected to the controlling and evaluating unit. In an embodiment, the detector is divided into four individual detectors, wherein the first individual detector collects the direct light arising from the illuminating laser light. The second, third and the fourth individual detector collect scattered light scattered in different directions by an object 40 passing through the centerline of the Gaussian laser beam 32.

Returning now to FIG. 2, the collected laser light is transmitted by said optical fiber bundle 24 and will be received by the controlling and evaluating unit 16, more precisely the collected light will be received by analogue amplifier module 52, which is a multichannel amplifier module 52. On its input, said amplifier module 52 comprises sensing elements or detectors Aj, . . . , Ap (preferably PIN type or avalanche photodiodes; not shown in the Figures), one for each channel, that are connected to transimpedance amplifiers. Referring to the detector, the laser light coming from spatial regions enters the individual photodiodes of the detector without interpolation of the optical bundle. The photodiodes are connected to transimpedance amplifiers. Each channel comprises more than one AC-coupled stage for amplifying further, level matching and filtering the obtained electrical signal. An electrical signal proportional to the incident light power appears on the output of the analogue amplifier module 52. In a further embodiment, a further electrical signal proportional to the average incident light power also appears on the output of said analogue amplifier module 52.

The analogue amplifier module 52 is connected to an analogue-to-digital converter module 53 of said controlling and evaluating unit 16, which digitizes the output signals of the analogue amplifier module 52 channel by channel and transmits them to a signal processing unit 54.

The signal processing unit 54 determines the parameters of the digitized electric pulses, for example their peak values, lengths in time, average values, integrals, signal shapes, that correspond to the light scattered by said objects 40 and are generated on the output of the analogue amplifier module 52 and then are digitized by the analogue-to-digital converter module 53. Then, an evaluation unit 55 of the controlling and evaluating unit 16 derives from these parameters the physical properties of the objects 40 in the sample. If needed, the obtained physical properties can be displayed and/or stored for a later usage in an appropriate storage medium.

To control/position the illuminating laser beam 32, based on a part of the parameters determined by said signal processing unit 54, a control unit 56 governs the beam moving device 20 by means of a motor 58 through a motor driving means 57 and an appropriate transmission, as will be discussed below in detail.

It should be noted that in an embodiment of said controlling and evaluating unit 16 the analogue-to-digital converter module 53, the signal processing unit 54, the evaluation unit 55 and the control unit 56 (or one or more thereof) can be replaced by a properly programmed computer that provides for digitizing the analogous electrical signals, evaluating the digitized signals, as well as displaying (preferably in the form of e.g. scatter plots illustrating the populations of the formed elements in the sample separately) and storing, if needed, the obtained results and adjusting the illuminating laser beam 32 based on said results, be it either desired or required.

FIG. 2 illustrates an embodiment of an optical flow cytometer. The light guide 304 and light collector element 70 and the fiber coupling elements 71 collect and transmit the part of the fluorescent light emitted from the colored objects 40 moving in the flow cell 22 into the detector element which is a multi-element avalanche photo diode or photon multiplier tube.

The output is connected to the input of an analog to digital converter, it can be a part of the signal processing unit 54.

The optical unit 14 comprises a transmitter module 18 providing the illumination needed for the measurement to be performed, an optional beam moving device 20, a flow cell 22 and an optical fiber bundle 24 or a direct light detector, all arranged in a light path, and fluorescence light collector module collect the light emitted or scattered from the said painted particles 100 and transmit a part of this light into the detector element.

The fluorescence light collector module contains light guide 304 light collector elements 70 and fiber coupling elements 71 and an optical fiber 72 arranged perpendicular to the light path at the flow cell 22. These elements collect the said light emitted or scattered from the objects 40 and couple it into the said optical fiber 72. The optical fiber 72 transmits the said emitted or scattered light into the filter module which contain a condenser lens 73 one or more optical filter(s) 74 with wavelength dependent transmission coefficient and a coupling element 75 arranged in an optical axis which transmit the higher wavelength fluorescence light coming from the painted object 40 into the multi-element avalanche photodiode array detector and block the lower wavelength scattered light coming from the objects 40 or coming from the laser source and reflected from the other optical elements like flow cell 22.

There is a clean-up filter element in the transmitter module 18 to change the laser source intensity profile depend on the wavelength. There is pass band close the wavelength of laser source where the said laser beam 32 go throw the filter with the possible minimum absorption, and there is a stopband in the emitting wavelength of fluorescent dye where the said laser beam 32 go throw the filter with the possible maximum absorption depend on wavelength.

The fluorescent dye as is well known, paints the cellular elements of the whole blood in different degree, depend on the physical, chemical and biological property of the elements. The physiologic properties like maturity of the cellular elements modulates the said physical, chemical and biological property and modify the paint degree through this. During the whole blood or other cellular components or fluorescently painted objects 40 travel in the centerline of the sample flow area 221 where a part of the laser light striking said objects. The fluorescent dye is excited by the said laser and a part of the energy of the laser emitted back as a longer wavelength fluorescent light. In this way the intensity of the emitted fluorescent light from the painted objects 40 depend on the physiologic properties of the said particles 100.

In what follows, the hydro-pneumatic unit 12 of the flow cytometer 10 according to the invention and its operation is discussed in detail with reference to FIG. 1.

The task of the hydro-pneumatic unit 12 of the flow cytometer 10 according to the invention is to produce the sample solution of a sample in the biochemical preparation unit 64 to be analyzed that is suitable for being assayed in an optical type of analysis, to prepare the thus obtained sample solution for the analysis and then to feed it into the flow passage 300 of the flow cell 22 and to form it to the appropriate cross section at a constant volume rate, as well as to advance it through said passage 300 during the measurement.

Said production and preparation of the sample solution comprises mixing the sample to be assayed with the various reagents and fluorescence dyes, as well as controlling temporal and spatial course of the (bio)-chemical reactions taking place within the mixture (in particular, adjusting the volume ratios of the reagents to be mixed up, the incubation times and the temperature)—all that is performed in a biochemical preparation unit 64.

The biochemical preparation unit contain the reagents and aspirates the sample required to the said preparation. The biochemical preparation unit 64 is known per se. The biochemical preparation unit prepare the biological sample and create the sample solution by adding reagent(s) and incubate it in the proper temperature and time.

Feeding the prepared sample solution into the flow cell 22 takes place through special unifying element 66 that provides simultaneously for a hydrodynamical focusing and cross section forming of said sample solution and the orientation fixing of the of the particle in the sample solution and the fluidic connection between the sample branch 62 and the sheath branch 63 as well. And the flow cell 22 and the unifying element 66 form one common cuvette 306 which is typically made from plastic by injection molding.

The hydro-pneumatic unit 12 comprises a closed liquid flow path extending between a starting point and an end point. Said liquid flow path consists of a sample branch 62 and a sheath liquid branch 63 that preferentially extend parallel to one another in the embodiment disclosed. The starting point of the sample branch 62 and of the sheath liquid branch 63 is a tank 77 kept at a certain (preferably atmospheric) pressure for storing the sheath liquid. To the sample branch 62 close to the unifying element 66, a sample preparation unit 64 and close to the common end of the two branches a sheath pump, are connected through valves Vm, Vd. The biochemical preparation unit 64 insert the said prepared sample into the sample branch 62 through the valve Vm during the measurement preparation. The sample branch 62 and the sheath liquid branch 63 meet in the unifying element 66, from here they run together through the flow passage 300 to the end point. At the end point of the hydro-pneumatical unit 12, a vacuum tank 59 at a pressure lower than the pressure maintained in said tank 77 by about 0.35 to 0.70 bar is arranged, vacuum tank 59 is for receiving and optionally also for collecting the sample solution leaving the flow cell 22.

Said liquid flow path between the starting point and the end point is provided by conduits that branches away, according to needs. The sample pump 111 and the biochemical preparation unit 64, the cuvette 306 is inserted into said conduits one after the other (in the given order) in a flow direction that points from the starting point to the end point. Moreover, upstream said unifying element 66, in flow direction before it, two-way cross valves Vd, Vm and Vt, and a are inserted into the sample branch 62 and into the sheath liquid branch 63, respectively.

The flow exiting from the flow cell 22 reaches the vacuum tank 59 via a valve Vv. One of the inlets of the cross valve Vd is in fluid communication with the sample pump 111, while the remaining inlet thereof is connected into the sheath liquid branch 63. The outlet of the cross valve Vd is in fluid communication with the inlet of the cross valve Vm. While the remaining inlet of the cross valve Vm is in fluid communication with the biochemical preparation unit 64. The outlet of the cross valve Vm is in fluid communication with the inlet of the cross-valve Vt. One of the outlets of the cross valve Vt opens into the unifying element 66, while the remaining outlet thereof is connected into the flow path through a bypass 65 in flow direction between the flow cell 22 and the valve Vv. Said cross valves Vm, Vt, Vd and the valves Vv, are preferably precision valves that influence the flow conditions prevailing within the hydro-pneumatical unit 12.

FIG. 2-7 illustrates preferred embodiments of a cuvette 306. The unifying element 66 has a hollow structure which forms a fluidic T-connector, provides simultaneously for a hydrodynamical focusing of the objects 40 cross section forming of said sample flow 205 and the fluidic T connection between the sample branch 62 and a sheath liquid branch 63 and the flow cell 22 as well.

The hollow of the unifying element 66 is filed with sheath fluid reagent and sample solution and the liquids flowing through the unifying element 66 from the sample branch 62 and a sheath liquid branch 63 to the flow cell 22 and forming the sample flow 205 and the sheath flow 206 and the combined flow 222 so as to facilitate the analysis of said cellular elements. The composition of sheath fluid reagent and dilution reagent of sample solution are known per se. These fluids be able to model as a Newton-type fluid with viscosity close to the water, temperature is room temperature, the flow is laminar except the sample injection area 203a.

The unifying element 66 consists of a sample injector 200 and sheath preparation element 401 a common flow formation element 402 and a sample injection element 403a the holes inside of these elements in order: sheath preparation area 201, sample injection area 203a, flow formation area 202. The sheath preparation area 201, the sample injection area 203a, the flow formation area 202 and the flow passage 300 form a continuous channel as they connect to each other in order listed above. This channel is free of the sharp edges and corners to create a laminar sheath flow 206.

The sheath preparation area 201 connects to the sheath branch 63 through the sheath channel 404, the sample injector 200 connects to the sample branch 62 through the sample channel 405 and the output of the flow passage 300 connects to the Vv valve through the waste channel 406.

The sample injector 200 feeds the said prepared sample solution into the sample injection area 203a of the unifying element 66 and forms a T junction together to create a combined flow 222 from the sample flow 205 and the sheath flow 206. The mouth of the sample injector 200 has a mouth with protruding or sharp edges so that the resulting sample flow does not spill over.

The angle between the axis of the injector 200 and the axis of the sample injection area 203a is acute angle to insert the sample flow 205 into the sheath flow 206 into the proper position and without mixing. The velocity vector of the sample flow 205 has a parallel and a perpendicular component relative to the velocity vector of the sheath flow 206 in the sample injection area 203a. These parallel and perpendicular velocity vector components of the sample flow 205 are modified by the relative magnitude of the velocity vector of the sample flow 205 and the angle between the axis of the sample injector 200 and axis of the sample injection area 203a. The larger the perpendicular component of the velocity vector the higher the vertical position of the inserted sample flow 205 inside the combined flow 222. The smaller the different between the parallel component of the velocity vector of the sample flow 205 and the velocity vector of the sheath flow 206 the smoother the insertion of the sample flow 205.

The inner surface of the sheath preparation element 401 forms a tube to feed and form cross section of the sheath fluid and create a laminar sheath flow at the input plate of the tube inside of the sample injection element 403a wherein the sample flow 205 injected into the sheath flow 206. The sample injection area 203a which is a hole inside the sample injection element 403a the angular injected sample reaches the flow rate of the sheath flow 206 and creates the combined flow 222 at the output plate of the sample injection element 403a and the sample injection element 403a forms a bend. The hole inside of the flow formation element 402 connect to the sample injection element 403a at the output plan of it and form the cross section of the combined flow 222 and speed it up. The flow formation element is connected at the output plain of it into the flow passage 300 that is made from transparent material wherein the sample is assayed. The combined flow is laminar in the flow formation element 402 and in the flow passage 300.

Figure 3:
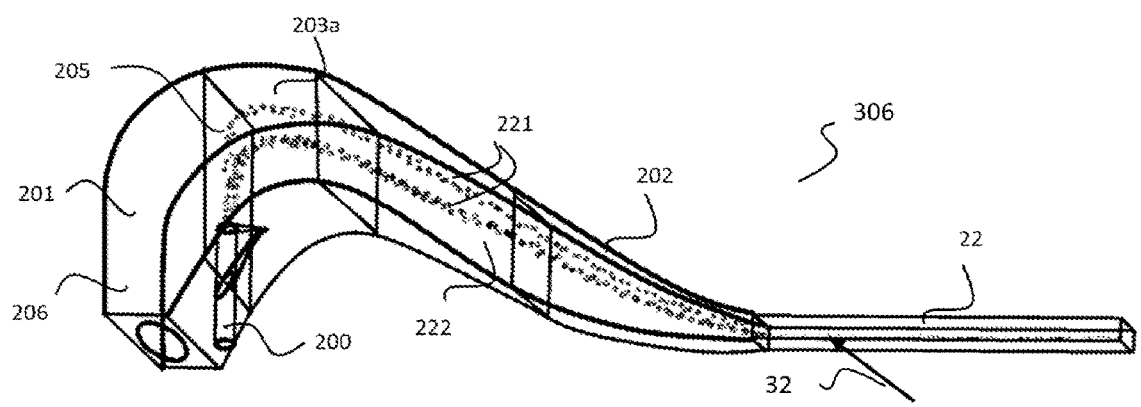
FIG. 3, 4, 5 depict an embodiment of the hollow structure of a cuvette.

FIG. 3 illustrates an embodiment of the hollow structure of the cuvette 306, wherein said embodiment comprises: protruding sample injector 200 and a cuboid shape sheath preparation area 201 and curved sample injection area 203a with rectangular cross section and truncated pyramid shape flow formation area 202 wherein the major axis of the sample injector 200 is perpendicular to the path of a laser beam 32.

FIG. 3 illustrates an embodiment wherein the vertical position of the sample flow 205 is changed because of the different sample flow 205 velocity. The higher sample velocity results from a higher vertical sample flow position relative to the laser beam 32. In this way the sample offset-able relative to the laser beam. It is an alignment function between the sample flow 205 and the laser beam 32 without moving optical or mechanical element.

Figure 4:
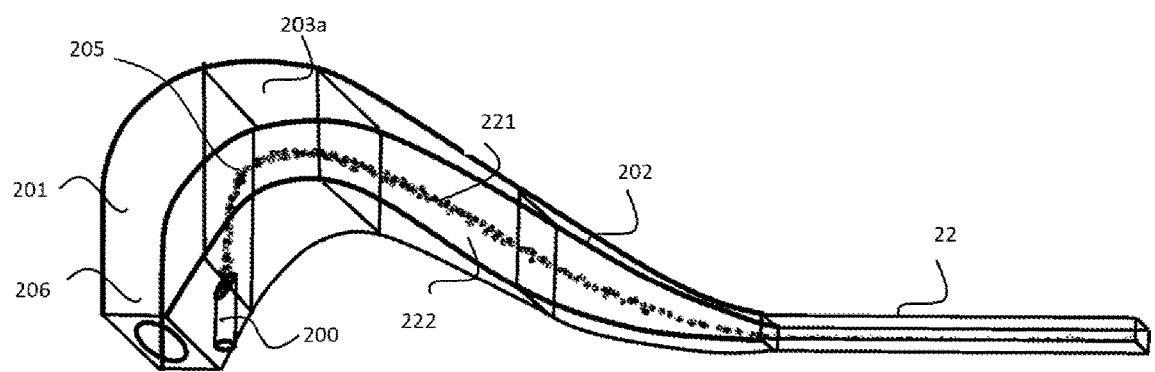

FIG. 4 illustrates an embodiment of the hollow of the cuvette 306, wherein said embodiment comprises: sample injector 200 smooth in the canal wall and a cuboid shape sheath preparation area 201 and curved sample injection area 203a with rectangular cross section and truncated pyramid shape flow formation area 202 and the flow passage 300.

Figure 5:
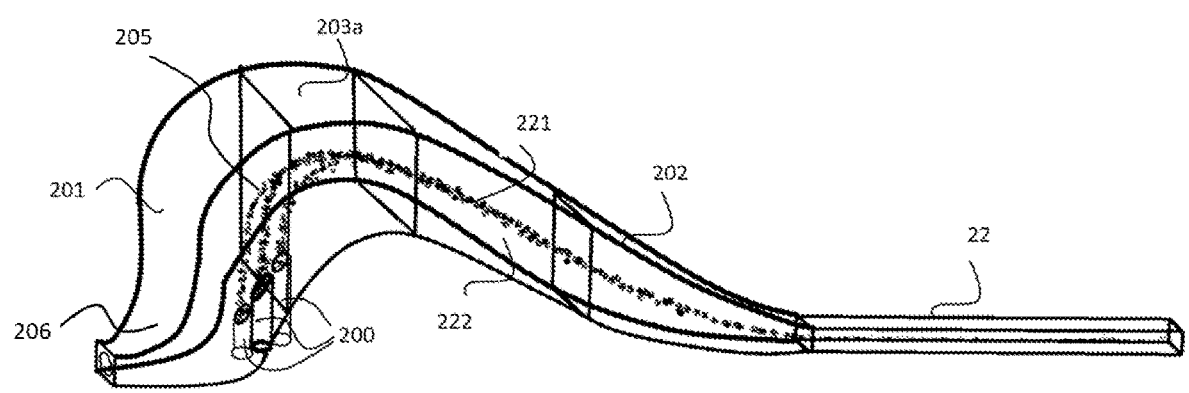

FIG. 5 illustrates an embodiment of the hollow of the cuvette 306, wherein said embodiment comprises: three sample injectors 200 are smooth in the canal wall and a curved truncated pyramid shape sheath preparation area 201 and curved sample injection area 203a with rectangular cross section and truncated pyramid shape flow formation area 202 and the flow passage 300. The sample injectors 200 are in the horizontal axis of the cuvette 306 close to each other. The velocity of sample flow in the different sample injectors 200 set to result similar vertical sample flow 205 position in the flow passage 300. The different sample injectors 200 are used in consecutive samples one after another. The independent sample injectors 200 for consecutive sample reduce the measurement time and help overlapping the measurement processes.

Figure 6A:
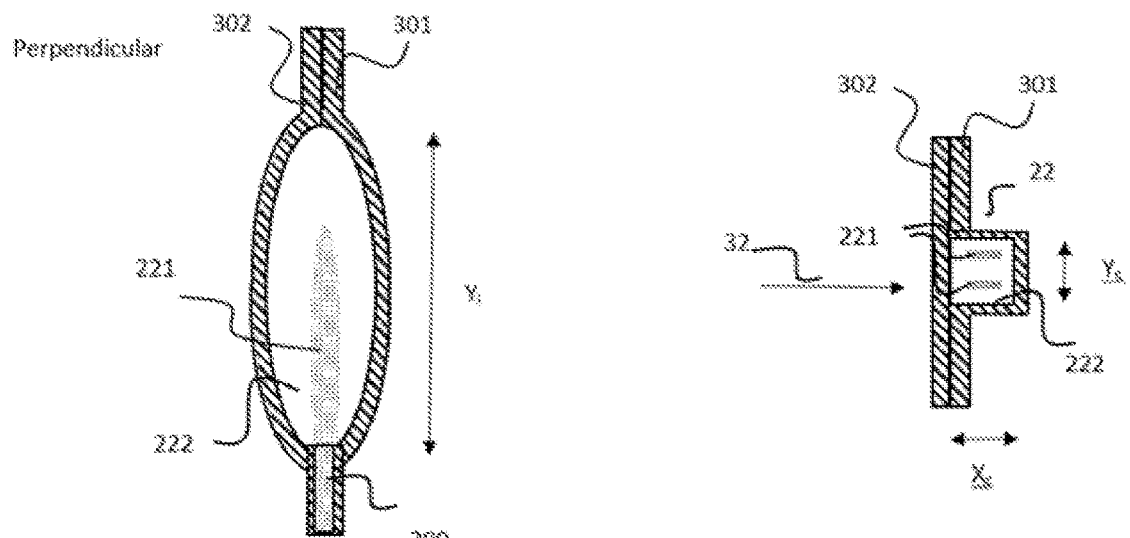
FIGS. 6A and 6B show an embodiment of the unifying element and the cuvette in a cross-sectional view with the injector being parallel (FIG. 6A) or perpendicular (FIG. 6B) orientated to the laser beam.
Figure 6B:
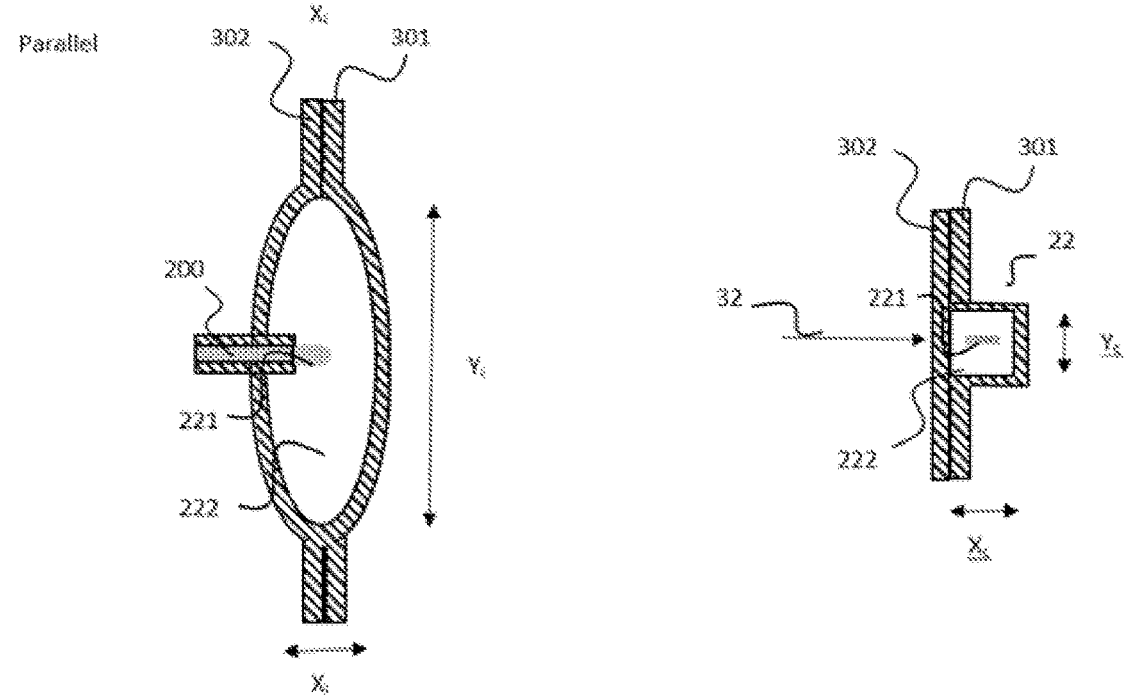
Figure 7:
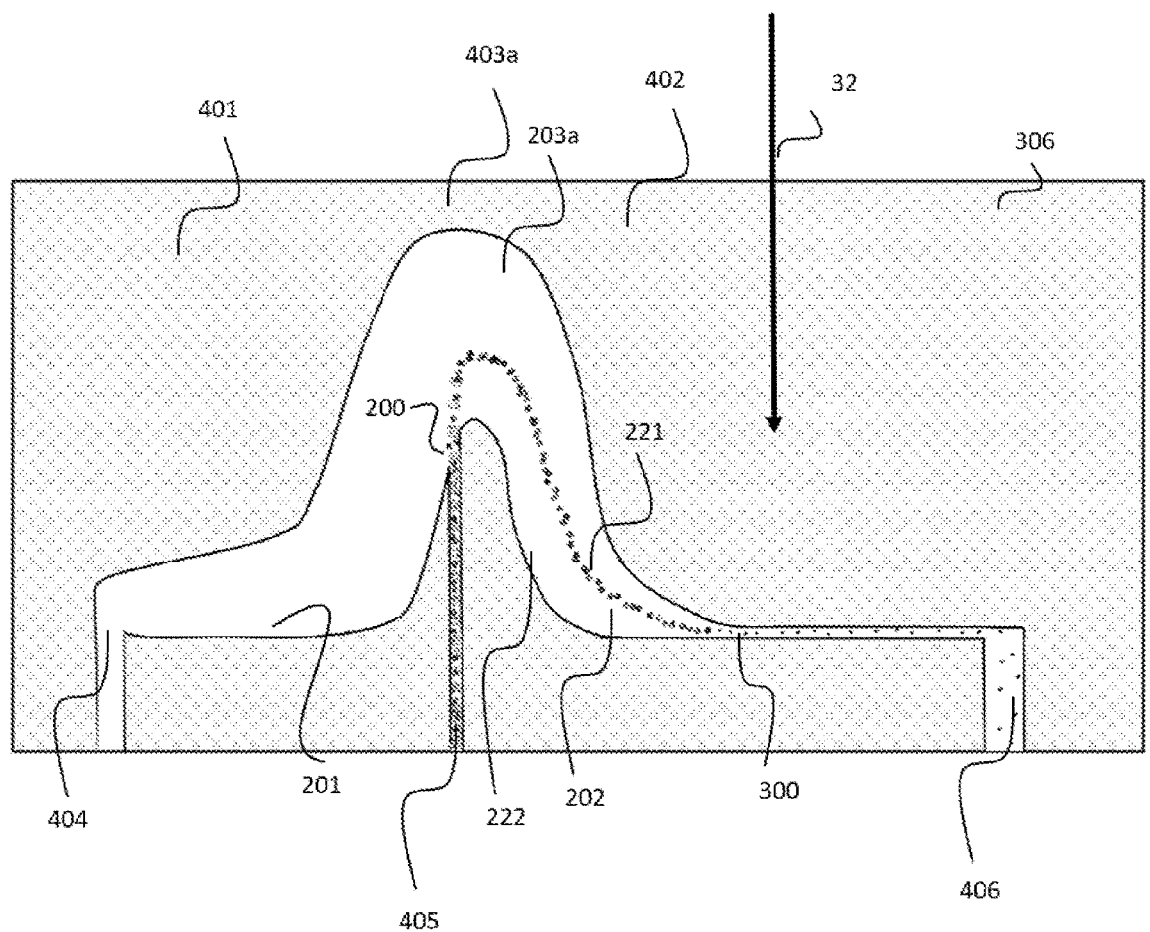
FIG. 7 shows an embodiment of the cuvette in cross section view.

FIG. 6 illustrates two preferred embodiment of the cuvette 306 in a, case the sample injector 200 perpendicular to the laser beam 32 and in b, case the sample injector 200 is parallel to the laser beam 32, wherein said embodiment comprises: sample injector 200 smooth in the canal wall or protruding and a truncated cone shape sheath preparation area 201 and curved sample injection area 203a with elliptical cross section and truncated cone shape flow formation area 202 wherein the cross section change from elliptical to circular then rectangular and the flow passage 300. FIG. 6 illustrates the cross section of the cuvette 306 in the plane of the sample injector 200 and in the connection plane of the flow cell 22 and the flow formation element 402. The sheath preparation element 401 generate a laminar flow in the plain of the sample injector 200, the sample injector 200 insert the sample flow 205 into a predefined position set by the angle between the sample injector 200 and the main axis of the sample injection area, and the relative magnitude of the velocity vector of the sample flow 205. The main axis of the sample flow and the main axis of sheath flow 206 are nearly perpendicular to each other. The cross section of the sample flow 205 is circular, the sample flow 205 turns into the direction of the sheath flow 206 at the end plate of the sample injection area 203a and form a combined flow 222 the sample flow area 221 is circular cross section. The cross section of the flow formation area 202 is changed along the flow from elliptical to circular than rectangular in the connection plain of the flow passage 300. This presses the combined flow 222 cross section from elliptical to circular and presses the sample area 221 cross section from circular to plate into the connection plane of the flow cell 22. The vertical position of the sample flow area 221 changing because of the different relative sample flow velocity in a given mechanical structure, the higher sample velocity results higher vertical sample flow area 221 position. In this way the sample position will move parallel to the main axis of the sample injector 200 in the flow passage 300. In perpendicular case the movement of sample flow area 221 inside the combined flow 222 results different illumination because of the changing power intensity across the laser beam 32. In parallel case the movement of sample flow area 221 inside the combined flow 222 doesn't result different illumination because the laser spot intensity doesn't change in direction of the laser beam 32.

To perform a measurement, all three major components of the flow cytometer 10 according to the invention are activated. In particular, the hydro-pneumatical unit 12 prepares to produce a sample flow apt for being measured and to deliver it into the flow cell 22, the optical unit 14 generates the laser beam 32 required for the desired irradiation of the flow cell 22, while the controlling and evaluating unit 16, in case of need, provides for an appropriate adjustment/positioning of the illuminating spot 102 of the laser beam 32, as will be discussed later in more detail.

Before commencing the measurement, the reagent branch 63 and the sample branch 62 and the flow cell 22 and the unifying element 66 are filled up with reagents (e.g., also with the sample aspirated into the biochemical preparation unit 64 and the said preparation are done, the sample solution is created), the sheath tank 77 storing said sheath liquid.

After completing the above filling up, the valve Vv is opened and the biochemical preparation unit 64 inject the sample solution through the cross valve Vm and Vt and the bypass 65 and Vv into the vacuum tank 59. The tubing between the valves Vm and Vt contains a part of the sample solution after said injection. Then, cross valve Vt and Vm which are arranged in the sample branch 62 change to a position in which they conduct from the sheath tank 60 towards the unifying element 66, and due to the already mentioned pressure difference, the sample solution will pass towards the vacuum tank 59 through the unifying element 66. In order to deliver (that is, to feed) the prepared sample flow 205 to the unifying element 66 relatively rapidly, it is preferred to keep the valve Vs within the sheath liquid branch 63 temporarily in its closed position.

After completing the above feed up, the valve Vs within the sheath liquid branch 63 changes into an open position. Subsequently, due to the already mentioned pressure difference, the sample solution will pass towards the vacuum tank 59 through the cuvette 306. When the valve Vs is opened, due to the pressure difference a flow of sheath liquid commences in the sheath liquid branch 63 towards the vacuum tank 59 through the unifying element 66 and the flow cell 22.

Due to its geometrical construction, said unifying element 66 places the sample solution coming from the sample branch 62 into the predefined position of the sheath liquid flow coming from the sheath liquid branch 63 and reduces its cross-sectional size to a cross-section that is smaller than the cross-section of the passage 300 of the flow cell 22. The crosswise position of the sample flow area 221 depends on the velocity of the sample flow 205 in the end of the sample injector 200. The proper crosswise position of the sample flow area 221 is set during the alignment process it happens during the manufacturing or the installation or start up or before each measurement depends on the risk of misalignment. The sample flow area 221 is moved cross the combined flow 222 as long as the maximum illumination detected, this position will be the proper flow setting. In case of disposable device, the automatic flow alignment is essential because the flow cell position cannot be good enough for the proper measurement.

The sheath flow 206 in the plane of the connection of the sheath branch can be turbulent the sheath preparation element 401 forms the sheath flow 206 to a flattened cross section (elliptical or rectangle cross section) and laminar flow in the plain of the sample injection.

In one preferred embodiment there is a smaller and a bigger axis of the sheath flow 206 and the bigger axis of the sheath flow 206 is perpendicular to the laser beam 32 illuminates the sample in the flow cell 22, and perpendicular to the sample injector 200. The velocity vector of the sheath flow 206 and the sample flow 205 is typically nearly perpendicular plane of the sample injection the two flows are not mixed and create a combined flow 222. The crosswise position of the sample flow area 221 inside of the combined flow 222 depends on the angular position of the sample injector 200 and the relative velocity of the sample flow 205. The sample flow is not laminar in this area but there is no mixing between the two liquid, the sample flow 205 speed up at the end plate of the sample injection element 403a. From this plate in the laminar flow there is a sample flow area 221 where the liquid coming from the sample branch 63 and sheath flow area where the liquid coming from the sheath branch 63, are separated inside the combined flow.

This combined flow 222 goes through the common flow formation element 402 which narrows the combined flow 222 and forms it to a circularly symmetrical cross section (circular or square cross section) again. The cross section of the sample flow area 221 in the plane of the sample injection is determined by the inner form of the sample injector 200, it is typically circular. Due to the different compression ratio parallel and perpendicular to the 'plane flow', the common flow formation element 402 realigns the combined flow 222 and compresses the flow in a varying degree in different directions. The bigger compression ratio results in a flattened sample flow area 221 perpendicular to its direction.

The sample flow area 221 cross section is changed from circular to 'plane flow' along the axis of the common flow formation element 402. The bigger asymmetry of the combined flow 222 in the plate of the injection result bigger asymmetry of the sample flow area 221 in the connection of the flow cell 22. The thus obtained composite stream, i.e., the sample surrounded by the sheath liquid flows from the unifying element 66 into the passage 300 of the flow cell 22. Said flow is laminar, and thus the sheath liquid and the sample do not mix up, the formed sample flow area 221 do not changes its cross section along the passage 300 of the flow cell 22. The combined flow 222 cross the laser beam 32, and the 'plat flow' is parallel to the direction of the laser beam.

During passage through the flow passage 300, the sheath liquid keeps the sample the whole time at the predefined position of the passage 300.

In one case the adjustment of the adequate velocities takes place by the flow impedances of the sample branch 62 and the sheath liquid branch 63. The ratio of the volume flow rates setting in within the two branches is inversely proportional to the ratio of impedances of those portions of the entire liquid flow path that form said two branches and uniquely defines the cross-sectional area of the developing sample flow. Consequently, the cross-section area of the sample solution travelling in the flow passage 300 of the flow cytometer 10 according to the invention can eventually be controlled (to a small extent) by varying the ratio of the flow impedance of the sample branch 62 to the flow impedance of the sheath liquid branch 63. In particular, by increasing the impedance of the sample branch 62 (e.g., by reducing the number of reagent branches) or by decreasing the impedance of the sheath liquid branch 63, the cross-sectional area of the sample flow area 221 decreases, and vice versa. As a consequence, the measurement can be performed on a stable sample flow 205 with no fluctuations, which allows to derive more precise results. It is noted that the size of a pressure drops building up along the liquid flow path as a whole can be changed by a valve Vv inserted between the flow cell 22 and the vacuum tank 59; said valve Vv can be e.g., an electronically controlled precision valve of variable flow rate. It is also noted that the ratio of the flow velocity in the sample branch 62 to the flow velocity in the sheath liquid branch 63 can be adjusted in a given range arbitrarily and set to a desired value by means of the valve Vs. Hence, formation of the laminar flow of the sample solution and the sheath liquid can be facilitated within the unifying element 66. The crosswise position of the sample area 221 also controlled by the velocity of the sample flow but by only the perpendicular component of it. So, for the proper flow structure the sample flow 205 and sheath flow 206 speed have to set to fit for both condition in a mechanical system. If the sheath flow 205 velocity increases the area of the sample flow area 221 is decrease in the flow passage 300. If the sample flow 206 velocity increases the area of the sample flow area 221 is increase in the flow passage 300 and the crosswise position of the sample flow area 221 is higher in the flow passage 300.

Another embodiment refers to a condition, when the velocity in the unifying element is set by the sample pump 111 for the sample fluid and by the pressure different between the vacuum tank 59 and the tank 77 and the amount of fluidic resistance of the sheath liquid branch 63 and the unifying element 66 and the flow cell 22 for the sheath flow.

At the same time, the laser source 26 emits the illuminating laser light that reaches the flow cell 22 in form of the laser beam 32 that had gone through a beam shaping 33 controlled by control unit 56 and irradiates the liquid stream flowing in the passage 300. The sample surrounded by the sheath liquid and prepared biochemically or stained by a fluorescence dye as required and flowing through the flow cell 22 crosses the illuminating laser beam 32. Meanwhile, a portion of light of said laser beam 32 is spatially scattered by the objects 40 of said sample. Another part of the illuminating laser beam 32 is absorbed by the fluorescently stained particles 100 and a part of the absorbed laser energy is emitted as a longer wavelength light.

Depending on the construction of the used flow cell 22, said laser beam 32 is absorbed, deflected from its initial direction or transmitted by the flow cell 22. The scattered light leaving the flow cell 22 in a definite spatial region (here, in accordance with FIG. 2, in a low-angle region that forms an angle with the optical axis falling preferably between about 1.5° and about 3°, and in a high-angle region that forms an angle with the optical axis falling preferably between about 4° and about 8°; further spatial regions can also be defined, if desired) reaches the common end 42 of the optical fiber bundle 24, where it couples into the elementary optical fibers as already described, said light then reaches via the offtake bundles 24-1, . . . , 24-$p$ sensing surfaces of the sensing elements A1, . . . , Ap located on the input of the amplifier module 52 where it generates adequate electrical signals. Or said scattered light will reach the surface of the direct detector and the segment of the direct detector is connected to the input of the amplifier module 52. And a part of the said scattered light and fluorescently emitted light may go through the light guide 304 and will be coupled into the optical fiber, go through the filter module and will be focused into the multi-element avalanche photodiode array detector. The thus obtained electrical signals are then processed in a manner already described.

After the sample to be measured went through passage 300 in its entire length, by changing over the cross valve Vm, along with an open position of the valves Vv and Vs and an unaltered position of the cross valve Vt, due to the existing pressure difference only sheath liquid will flow through the unifying element 66 and the flow passage 300 that performs a cleaning/flushing of said elements and thus prepares the flow cell 22 for the measurement of the following sample.

It is to be noted here that when cross valves Vm, Vt and the valves Vs, Vv of the flow cytometer 10 according to the invention are properly adjusted (that is, by their setting into closed/opened positions, as desired), the steps of filling-up, mixing, feeding and measuring can be effected merely by the difference in pressures prevailing within the vacuum tank 59 and the tank 60 storing the sheath liquid, as is clear in view of the previous disclosure for a skilled person in the art.

In summary: in case of using an optical flow cytometer according to the present invention discussed merely with reference to some embodiments but to such an extent that allows a full understanding of its operation, Transmission of the light emitted by the illuminated fluorescent painted sample to be assayed, in a sample of human or animal whole blood, takes place by light guide form by the same material as the cuvette 306, during the assay and feeding, the advancement of the prepared sample, in particular of the sample of human or animal whole blood, takes place in a specific hydropneumatical device, wherein the blood sample moves in the flow cell to a narrowed sample flow area 221 cross-section due to the unifying element;

during the assay and feeding, the advancement of the prepared sample, in particular of the sample of human or animal whole blood, takes place in a specific hydropneumatical device, wherein the blood sample has more than one input in the flow cell to help the fast changing between the consecutive sample;

during the assay and feeding, the advancement of the prepared sample, in particular of the sample of human or animal whole blood, takes place in a specific hydropneumatical device, wherein the crosswise position of the sample moves in the flow cell is changeable due to the unifying element the sample passes the flow cell due to the pressure difference between the starting point and the end point of the liquid flow path, wherein said sample flow area 221 cross-section is defined by a ratio of the flow impedance of the sample branch 62 to that of the sheath liquid branch or due to the positive displacement pump.

Advantages of the invention can be summarized as follows:

a. In the current solution, a light guide in the cuvette is able to collect the part of the scattered or emitted light perpendicular from the laser axis without extra optical elements.

b. The cuvette is asymmetrical, so it is easy to manufacture by injection molding tool, so it is cheap and easy to manufacture.

c. The crosswise position of the sample flow is aligning able so the fitting between the laser beam and the sample flow is doable without mechanical movement of the optical element.

d. The presently described system is able to create the needed 'plate flow', by the especial design of the element connected to the flow cell and can increase the sample flow 205 volume.

e. The multiply sample input of the cuvette helps to speed up the measurement circle.

In an alternative solution it is theoretically possible to create the 'plate flow' by a special sample flow nozzle with asymmetrical cross section. But the laminated flow can't be as thin and equable as the current solution. The alignment between the sample flow and the laser spot can be done by mechanical movement of the optical element or the flow cell, or the sample injector.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A cuvette for use in an optical flow cytometer, wherein the cuvette has a hollow structure comprising a cuboid sheath preparation area arranged fluidically upstream from a curved sample injection area with a rectangular cross section arranged fluidically upstream from a pyramidal shaped flow formation area, wherein a sample injector is arranged along an intersection plane of both the cuboid sheath preparation area and the curved sample injection area.

2. The cuvette of claim 1, comprising more than one sample injector arranged at least partially overlapping with the intersection plane.

3. The cuvette of claim 1, wherein the sample injection area is curved and elliptical with a minor and a major axis.

4. The cuvette of claim 1, wherein the sample injection area has a rectangular shape with a smaller and a bigger axis which is perpendicular orientated with respect to the path of a laser beam.

5. The cuvette of claim 1, comprising a flow cell which is fluidically downstream from the pyramidal shaped flow formation area.

6. An optical flow cytometer comprising a cuvette according to claim 1.

7. A method of using an optical flow cytometer according to claim 6 comprising the step of measuring at least one property of a cellular component of a biological sample, wherein the at least one property is selected from the group comprising size, shape, internal granularity, maturity and corpuscular volume.

8. An optical flow cytometer comprising a cuvette according to claim 1, wherein a speed of a sample injection via the sample injection element is adjusted to a flow speed of a sheath fluid.

9. An optical flow cytometer comprising a cuvette for use in an optical flow cytometer, wherein the cuvette has a hollow structure comprising a cuboid sheath preparation area arranged fluidically upstream from a curved sample injection area with a rectangular cross section arranged fluidically upstream from a pyramidal shaped flow formation area arranged fluidically upstream from a flow cell, wherein a sample injector is arranged along an intersection plane of both the cuboid sheath preparation area and the curved sample injection area, wherein a major axis of the sample injector is arranged perpendicular to a path of a laser beam of the optical flow cytometer.

10. The optical flow cytometer of claim 9, wherein more than half of the sample injector is arranged perpendicular to the path of the laser beam of the flow cytometer.

11. The optical flow cytometer of claim 9, wherein the sample injection area is curved and elliptical with a minor and a major axis which is perpendicular orientated with respect to the path of a laser beam.

\* \* \* \* \*